United States Patent
Kim et al.

(10) Patent No.: US 9,482,523 B2
(45) Date of Patent: Nov. 1, 2016

(54) AIR MICROMETER

(71) Applicant: LG CHEM, LTD., Seoul (KR)

(72) Inventors: Jeoung Hwan Kim, Daejeon (KR); Jung Kyu Woo, Daejeon (KR); Shin Hwa Lee, Daejeon (KR); Woo Yong Lee, Daejeon (KR); Min Su Kim, Daejeon (KR); Hyang Mok Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 198 days.

(21) Appl. No.: 14/302,965

(22) Filed: Jun. 12, 2014

(65) Prior Publication Data

US 2015/0013433 A1 Jan. 15, 2015

Related U.S. Application Data

(63) Continuation of application No. PCT/KR2014/001724, filed on Mar. 3, 2014.

(30) Foreign Application Priority Data

Jul. 11, 2013 (KR) .................. 10-2013-0081739

(51) Int. Cl.
   G01B 13/08 (2006.01)
   G01B 13/06 (2006.01)

(52) U.S. Cl.
   CPC .................................... *G01B 13/06* (2013.01)

(58) Field of Classification Search
   CPC ...... G01B 13/12; G01B 13/02; G01B 13/06; G03F 9/7057; G03F 7/70341; G01N 2030/525
   USPC .................................. 73/37.5, 1.26
   See application file for complete search history.

(56) References Cited

U.S. PATENT DOCUMENTS 3,968,679 A * 7/1976 Ralbovsky ............ G01B 13/06
                                                226/22
2005/0157314 A1 * 7/2005 Typpoe .................. D21F 7/06
                                                356/630
2008/0081963 A1 * 4/2008 Naghavi .................. A61B 5/01
                                                600/301
2009/0143655 A1 * 6/2009 Shani ................... A61B 5/0059
                                                600/323
2011/0023584 A1 * 2/2011 Fujimura ............... G01B 13/19
                                                73/37.5
2012/0276661 A1   11/2012 Iravani et al.

FOREIGN PATENT DOCUMENTS

| EP | 0315315 A1 | 5/1989 |
| JP | 61-262609 A | 11/1986 |
| JP | S62-195711 A | 8/1987 |
| JP | 1-265107 A | 10/1989 |
| JP | 2002-277227 A | 9/2002 |
| JP | 2009-168770 A | 7/2009 |
| JP | 2012-93306 A | 5/2012 |
| KR | 10-0467210 B1 | 1/2005 |
| KR | 10-0612743 B1 | 8/2006 |
| KR | 20-0439988 Y1 | 5/2008 |
| TW | 201308413 A | 2/2013 |
| WO | WO 2009/093520 A1 | 7/2009 |

OTHER PUBLICATIONS

Extended European Search Report, dated Feb. 24, 2015, for European Application No. 14729846.7.

* cited by examiner

*Primary Examiner* — Eric S McCall
*Assistant Examiner* — Mohammed E Keramet-Amircolai
(74) *Attorney, Agent, or Firm* — Birch, Stewart, Kolasch & Birch, LLP

(57) ABSTRACT

The present invention relates to an air micrometer. The air micrometer includes a target object accommodation slot having a bottom surface and a ceiling surface to accommodate at least one portion of the target object between the bottom surface and the ceiling surface, and an air spray unit including a nozzle opened in the bottom surface or the ceiling surface to spray the air onto the target object that is accommodated between the bottom surface and the ceiling surface.

8 Claims, 11 Drawing Sheets

AIR MICROMETER

CROSS REFERENCE TO RELATED APPLICATIONS

This application is a Continuation of PCT International Application No. PCT/KR2014/001724 filed on Mar. 3, 2014, which claims priority under 35 U.S.C. §119(a) to Patent Application No. 10-2013-0081739 filed in the Republic of Korea on Jul. 11, 2013, all of which are hereby expressly incorporated by reference into the present application.

TECHNICAL FIELD

The present invention relates to an air micrometer, and more particularly, to an air micrometer having a high measurement rate, excellent reproducibility, and accuracy.

BACKGROUND ART

The technical development and demand for mobile devices is increasing. Since secondary batteries have the properties of being rechargeable, capable of being manufactured in small sizes, and having high-capacity, there is a rapidly increasing demand for these batteries as an energy source for electrical and electronic devices including mobile devices, and many studies are being conducted on them.

Particularly, in terms of the shapes of the secondary batteries, prismatic batteries capable of being applied to products such as mobile phones due to their thin thicknesses and pouch-type batteries are in high demand. In terms of the materials for secondary batteries, the demand is increasing for lithium secondary batteries such as lithium cobalt polymer batteries having superior energy density, discharge voltage, and safety.

In general, lithium secondary batteries may be exploded due to high temperatures and pressures inside the batteries that are caused by abnormal operation states such as an internal short circuit, an overcharge, a state where the battery is exposed to high temperature, a falling impact, and so on. In such a secondary battery, one of the main subjects being studied is the improvement of battery safety.

In a process of manufacturing a pouch-type lithium ion polymer battery 101, there is a need to measure the thickness of a polymer battery packing material 103 and a polymer battery packing material sealing part 105 to secure safety (see FIG. 2, for a configuration of the lithium ion polymer battery). When the polymer battery packaging material 103 has a thickness over an allowed range, this leads to a defect in product and a reduction in uniformity, and ultimately, a poorly assembled product. Furthermore, there is the risk of battery explosion that may occur in the above-described abnormal operation states of the battery.

When the polymer battery packaging material sealing part 105 (hereinafter, referred to as a "sealing part") has a thickness over the allowed range, this is a defect of the sealing part 105. When the sealing part 105 has a defect, moisture in the air may be easily introduced into the battery to cause deterioration in the performance of the battery and in the long-term stability of the battery, for example, battery corrosion. Therefore, it is necessary to measure the thicknesses of the polymer battery packaging material 103 and the sealing part 105 to separate defective products and to examine the rate of defects.

The thicknesses of the polymer battery packaging material 103 and the sealing part 105 have been manually measured by workers using a contact micrometer. However, such a contact micrometer is inefficient, because the measurement speed is slow, and reproducibility of the measurement is reduced when the contact micrometer is used. Also, when the thicknesses are measured by using the contact micrometer, the contact trace may remain on the measured object, so that the measurement lacks accuracy.

Moreover, to identify the thickness distribution of the polymer battery packaging material 103 and the sealing part 105, many measurement points need to be measured, and there is thus a limitation in that the thickness distribution on a specific line or plane of the polymer battery packaging material 103 and the sealing part 105 may not be identified.

DISCLOSURE OF THE INVENTION

Technical Problem

Accordingly, the present invention aims at providing an air micrometer in which a measurement rate is high, reproducibility in measurement is excellent, a measured trace does not remain on an object to be measured, accuracy in measurement is superior, and thickness distributions of a polymer battery packaging material and a sealing part, which are target objects, on a specific line or surface of the target objects may be identified.

Technical Solution

According to an aspect of the present invention, there are provided an air micrometer, and a polymer battery packaging material or a sealing part as an object to be measured (hereinafter, referred to as a "target object"), and the air micrometer includes a target object accommodation slot having a bottom surface and a ceiling surface to accommodate at least one portion of the target object between the bottom surface and the ceiling surface and an air spray unit having a nozzle that is opened in the bottom surface or the ceiling surface to spray air toward the target object accommodated between the bottom surface and the ceiling surface.

Advantageous Effects

According to the present invention, since the air micrometer includes the target object accommodation slot having the width that is suitable for measuring thicknesses of the polymer battery packaging material and the sealing part, which are the target objects, and the air spray unit, the measurement rate may be high, and the reproducibility in measurement may be excellent, the measured trace may not remain on the target object, accuracy in measurement may be superior, and the thickness distributions of a polymer battery packaging material and a sealing part, which are target objects, on the specific line or plane of the target objects may be identified.

MODE FOR CARRYING OUT THE INVENTION

Hereinafter, preferred embodiments of the present invention will be described below in more detail with reference to the accompanying drawings.

Embodiment 1

Figure 1:
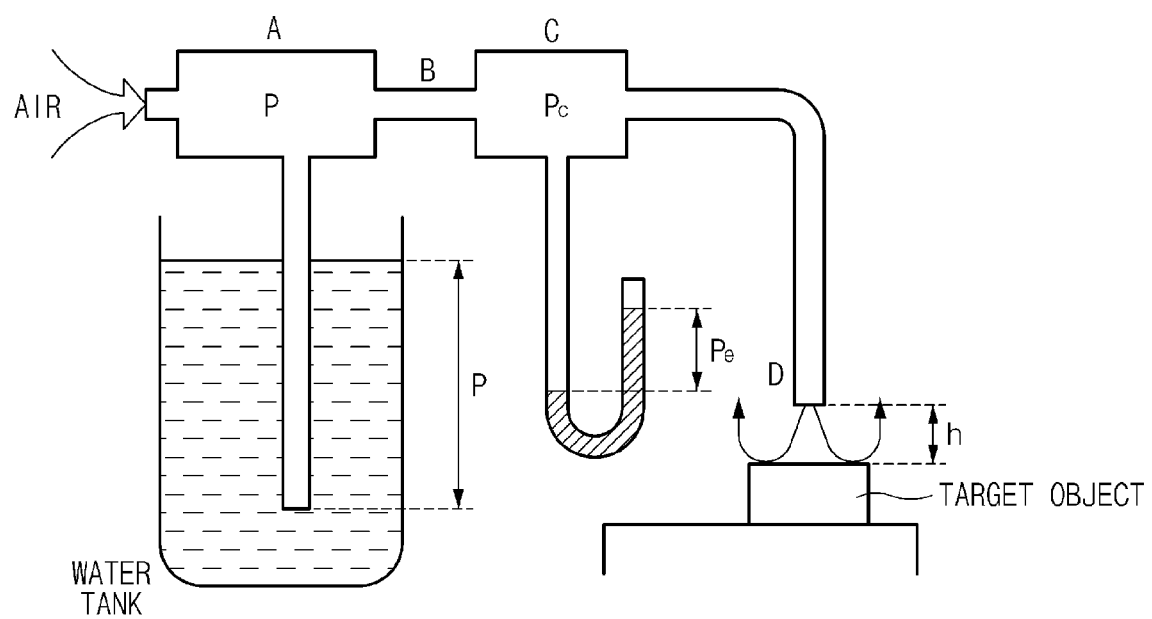
FIG. 1 is a conceptual view illustrating a principle of an air micrometer (or an air gauge)
Figure 2:
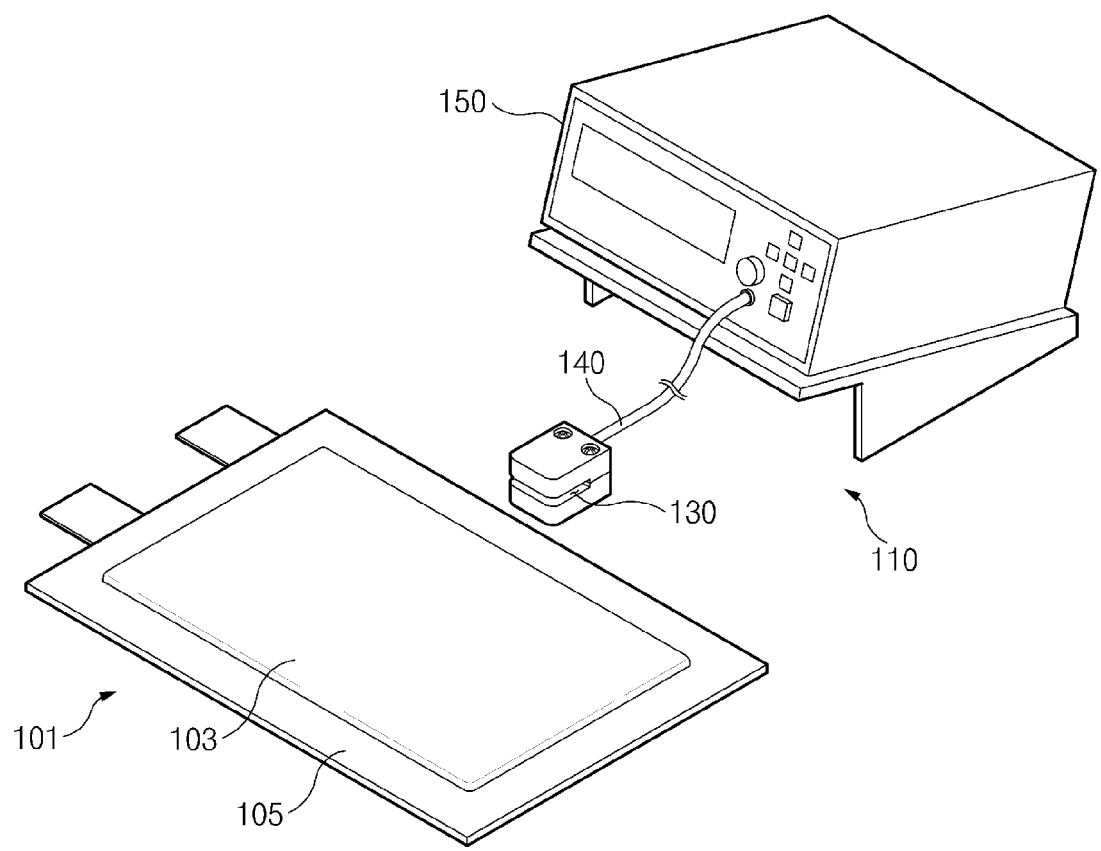
FIG. 2 is a perspective view of an air micrometer according to Embodiment 1 of the present invention.
Figure 3:
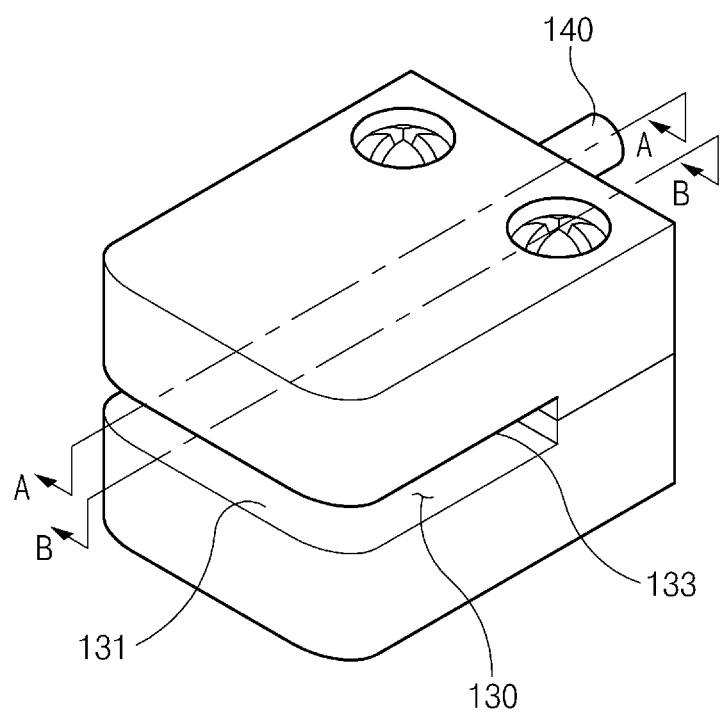
FIG. 3 is an enlarged perspective view of a target object accommodation slot and an air spray unit, which are provided in the air micrometer of FIG. 2.
Figure 4:
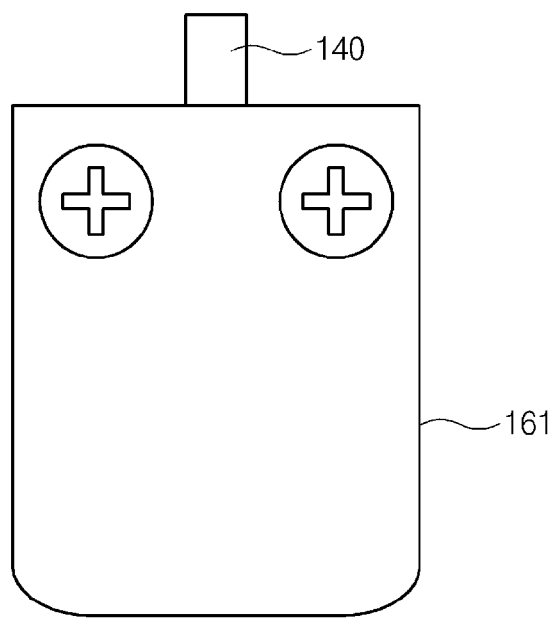
FIG. 4 is a plan view of the target object accommodation slot and the air spray unit, which are provided in the air micrometer of FIG. 2.
Figure 5:
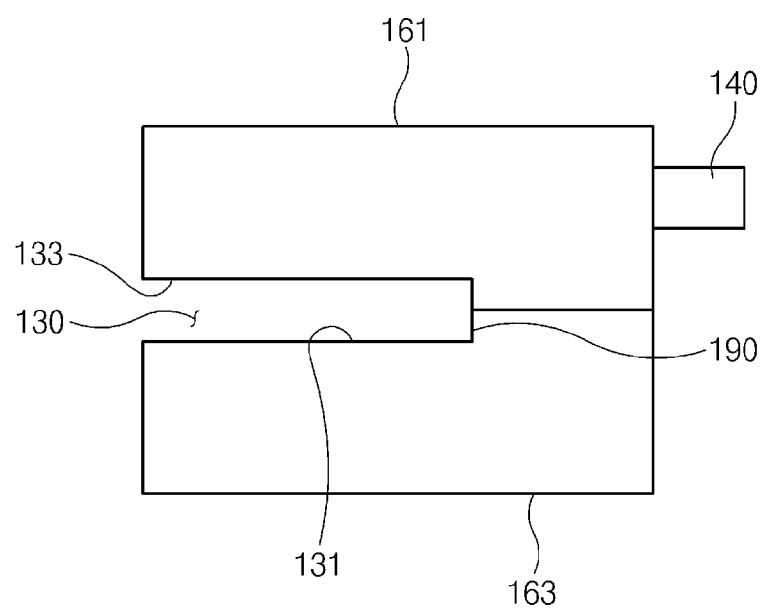
FIG. 5 is a right side view of the target object accommodation slot and the air spray unit, which are provided in the air micrometer of FIG. 2.
Figure 6:
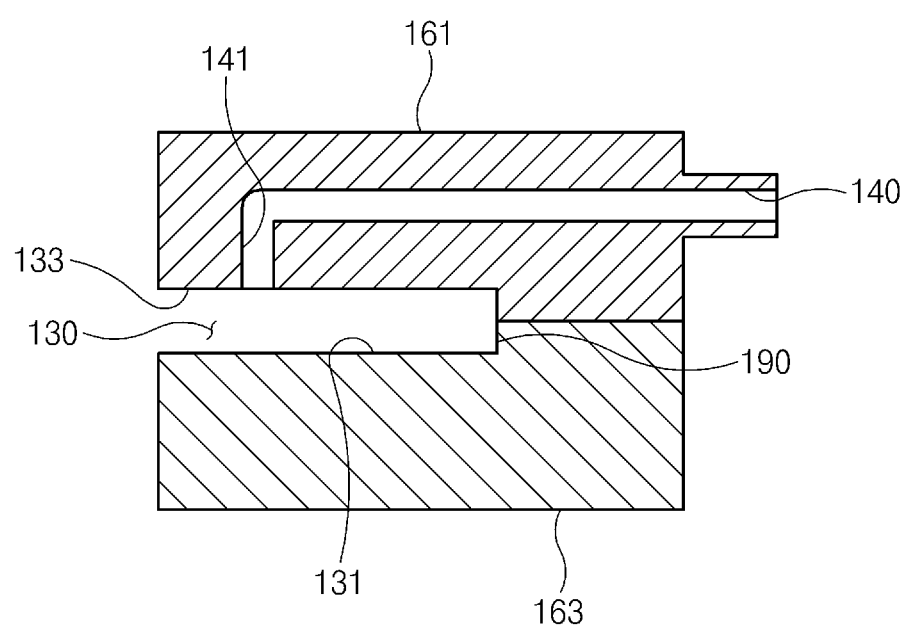
FIG. 6 is a cross-sectional view taken along line A-A of FIG. 3.
Figure 7:
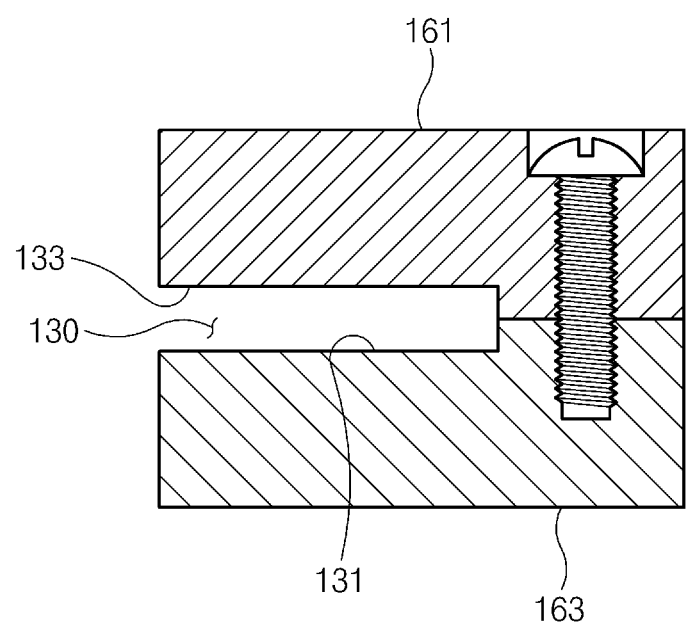
FIG. 7 is a cross-sectional view taken along line B-B of FIG. 3.

FIG. 1 is a conceptual view illustrating a principle of an air micrometer (or an air gauge), FIG. 2 is a perspective view of an air micrometer according to Embodiment 1 of the present invention, FIG. 3 is an enlarged perspective view of a target object accommodation slot and an air spray unit, which are provided in the air micrometer of FIG. 2, FIG. 4 is a plan view of the target object accommodation slot and the air spray unit, which are provided in the air micrometer of FIG. 2, FIG. 5 is a right side view of the target object accommodation slot and the air spray unit, which are provided in the air micrometer of FIG. 2, FIG. 6 is a cross-sectional view taken along line A-A of FIG. 3, and FIG. 7 is a cross-sectional view taken along line B-B of FIG. 3. Hereinafter, an air micrometer according to Embodiment 1 of the present invention will be described in detail with reference to FIGS. 1 to 7.

An air micrometer is a comparator that converts a dimensional change into a change in flow rate/pressure of air to measure a variation in air flow rate/pressure, thereby measuring the dimension. FIG. 1 illustrates a general air micrometer (or an air gauge).

Air is injected into an instruction chamber C through a small hole B having a diameter of about 1 mm while being maintained at a constant pressure P through a static pressure controller using a water tank and then sprayed through a nozzle D. In a state where an object to be measured (hereinafter, referred to as a "target object") is placed on a position that is close to the nozzle D, when a distance between the target object and the nozzle D is h, if the distance h changes, a pressure Pc in the instruction chamber C changes also. Thus, the distance h may be obtained by measuring the pressure Pc.

When actually measured, a standard gauge is placed under the nozzle D to read the pressure Pc. Then, the standard gauge is removed, and the target object is placed under the nozzle D. Here, since the distance changes, the pressure Pc may change also. Thus, a variation in pressure Pc may be continuously measured to obtain a dimension of the target object.

FIG. 2 is a schematic view of a pouch-type lithium ion polymer battery 101. FIG. 2 illustrates a packaging material 103, and a sealing part 105 of the polymer battery. Also, FIG. 2 illustrates an air micrometer 110 for measuring thicknesses of the packaging material 103 and the sealing part 105 of the polymer battery. The air micrometer 110 includes a target object accommodation slot 130, an air spray unit 140, and an air micrometer body 150. FIG. 3 is an enlarged perspective view of only the target object accommodation slot 130 and the air spray unit 140 in the air micrometer 110.

As illustrated in FIGS. 3 to 6, the target object accommodation slot 130 includes a bottom surface 131 and a ceiling surface 133. The battery packaging material 103 and the sealing part 105, which are the target objects, may be inserted between the bottom surface 131 and the ceiling surface 133 of the target object accommodation slot 130. Here, a lower surface facing the target object may be defined as the bottom surface 131, and an upper surface facing the target object may be defined as the ceiling surface 133. Air discharged from the air micrometer body 150 passes through the air spray unit 140 in the state where the target object is inserted between the bottom surface 131 and the ceiling surface 133.

The air spray unit 140 includes a nozzle 141 that is opened in the bottom surface 131 or the ceiling surface 133. The air discharged from the air micrometer body 150 is sprayed onto a position for measuring the thicknesses of the polymer battery packaging material 103 and the sealing part 105, which are the target objects, through the nozzle 141. In Embodiment 1 as illustrated in FIG. 6, the nozzle 141 is disposed in the ceiling surface 133. A pressure generated from the sprayed air is inputted into the air micrometer body 150. The air micrometer body 150 may measure the thicknesses of the polymer battery packaging material 103 and the sealing part 105, which are the target objects, through the inputted input value.

When the air micrometer 110 including the target object accommodation slot 130, the air spray unit 140, and the air micrometer body 150 according to the present invention is used to measure the thicknesses of the polymer battery packaging material 103 and the sealing part 105 which are the target objects, there are following advantages when compared to a case in which a worker manually measures the thicknesses one by one by using a contact type micrometer.

That is, when the contact type micrometer is used, it is inefficient because a measurement rate is low, and reproducibility in measurement is deteriorated. However, when the air micrometer 110 according to the present invention is used, since the thickness measurement is enabled by only inserting the polymer battery packaging material 103 and the sealing part 105, which are the target objects, into the target object accommodation slot 130, the measurement rate may be high. In addition, the reproducibility in measurement may be excellent because the air having a constant pressure may be always sprayed onto surfaces of the target objects through the nozzle. In this case, the total inspection for manufactured products, which measures dimensions of the products, may be enabled.

When the thickness is measured by using the contact type micrometer, a contact trace may remain on the measured object. However, since the air micrometer according to the present invention measures the thickness by using the air in a non-contact manner, a contact trace may not remain on the polymer battery packaging material 103 and the sealing part 105, which are the target objects. Also, since the measurement using the air micrometer is more stable when compared to that using the contact micrometer, the measurement may be superior in accuracy.

Also, since the air micrometer 110 according to the present invention successively measures the thicknesses, the air micrometer 110 may identify thickness distributions of the polymer battery packaging material 103 and the sealing part 105, which are the target objects, on a specific line or plane.

FIG. 7 is a cross-sectional view illustrating a state where an upper block 161 including the ceiling surface 133 is screw-coupled to a lower block 163 including the bottom surface 131.

The above-described type in which the target object accommodation slot 130 is defined by coupling the upper block 161 and the lower block 163, which are separate members, may have following advantages when compared to a type in which the target object accommodation slot 130 is defined by one member.

First, when a defect occurs inside the target object accommodation slot 130, the upper block 161 and the lower block 163 may be disassembled and thus easily repaired. Second, the upper block 161 or lower block 163 may be prepared in various types and replaced with each other. In this case, when specific product is measured in dimension, the upper and lower blocks 161 and 163 may be replaced with the most suitable upper and lower blocks to measure the dimension.

Although the upper block 161 and the lower block 163 are screw-coupled to each other in FIG. 7, the present invention is not limited thereto. For example, the upper block 161 and the lower block 163 may be integrally manufactured or coupled to each other by other coupling unit, instead of a screw such as a rivet.

Embodiment 2

Figure 8:
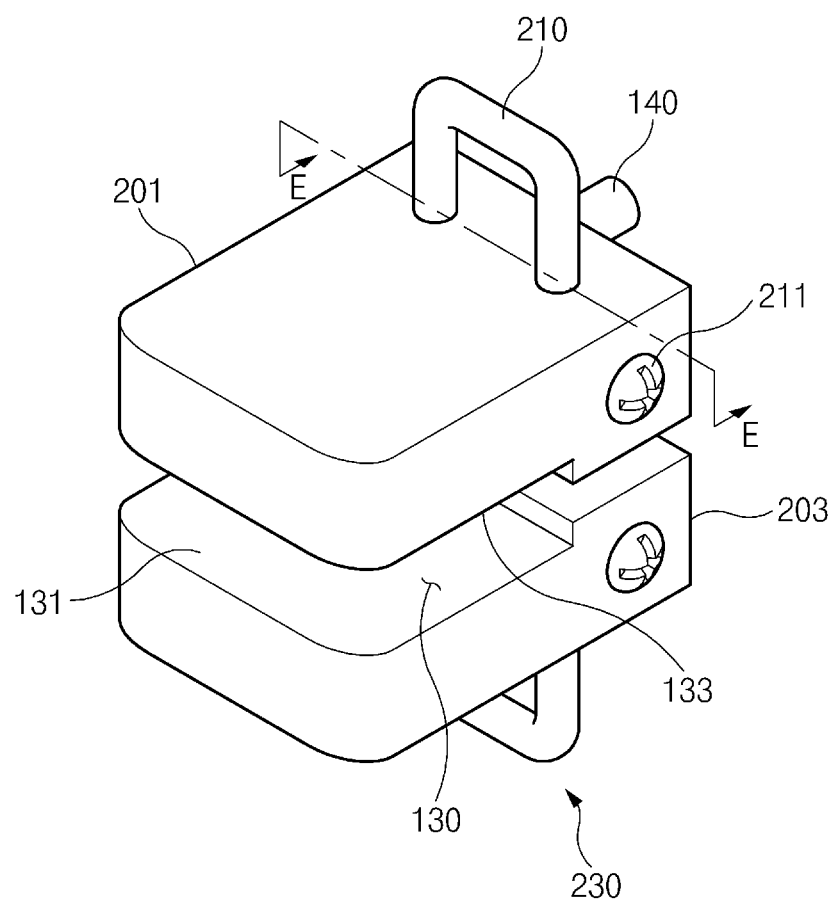
FIG. 8 is a perspective view illustrating a portion of constitutions according to Embodiment 2 of the present invention.
Figure 9:
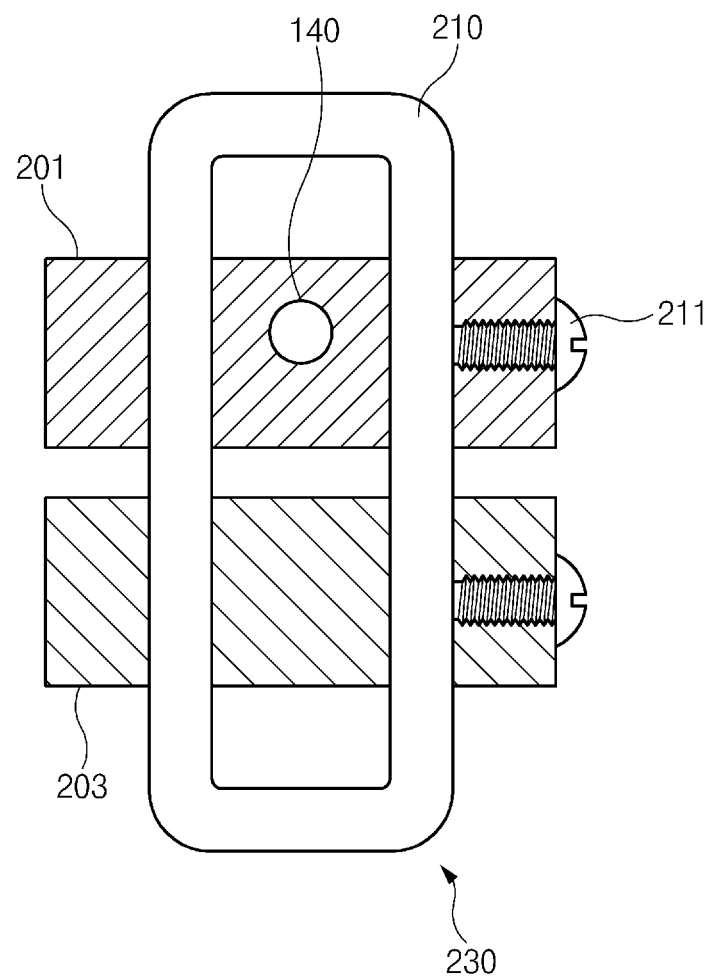
FIG. 9 a cross-sectional view taken along line E-E of FIG. 8.

FIG. 8 is a perspective view illustrating a portion of constitutions according to Embodiment 2 of the present invention, and FIG. 9 is a cross-sectional view taken along line E-E of FIG. 8. An air micrometer according to the present embodiment includes configurations similar to those of the air micrometer 110 according to foregoing Embodiment 1. However, the air micrometer according to Embodiment 2 is different from the air micrometer 110 according to foregoing Embodiment 1 in that the air micrometer further includes a guide rod 210 that is capable of adjusting a width of a target object accommodation slot 130. For reference, like reference numerals in Embodiment 2 denote like elements in foregoing Embodiment 1, and thus their detailed description will be omitted. Hereinafter, an air micrometer according to Embodiment 2 of the present invention will be described in detail with reference to FIGS. 8 and 9.

It may be necessary to adjust a width of the target object accommodation slot 130 in preparation for a case in which a polymer battery packaging material 103 and a sealing part 105, which are target objects, are significantly changed in thicknesses. As illustrated in FIG. 8, the target object accommodation slot 130 may be adjusted in width by using a width adjusting device 230 including the guide rod 210. Two holes passing through an upper block 201 including a ceiling surface 133 and a lower block 203 including a bottom surface 131 may be defined. The guide rod 210 may pass through the two holes. Thus, the upper block 201 and the lower block 203 may be slidably coupled to the guide rod 210.

The upper block 201 and the lower block 203 may move along the guide rod 210 in a direction where the upper block 201 and the lower block 203 are close to or away from each other to space the upper and lower blocks 201 and 202 forming each other by an adequate distance. Then, the upper and lower blocks 201 and 202 may be laterally tightened by using a screw 211 to fix the distance between the upper block 201 and the lower block 203.

Although the upper and lower blocks 201 and 203 are movable along the guide rod 210 in Embodiment 2, the present invention is not limited thereto. For example, one of the upper and lower blocks 201 and 203 may be fixed in relative position with respect to the guide rod 210, and the other one may be movable along the guide rod 210.

According to Embodiment 2, since the upper and lower blocks 201 and 203 move by a required distance and then be fixed, the air micrometer may measure target objects having various thicknesses without replacing the upper and lower blocks 201 and 203.

Embodiment 3

Figure 10:
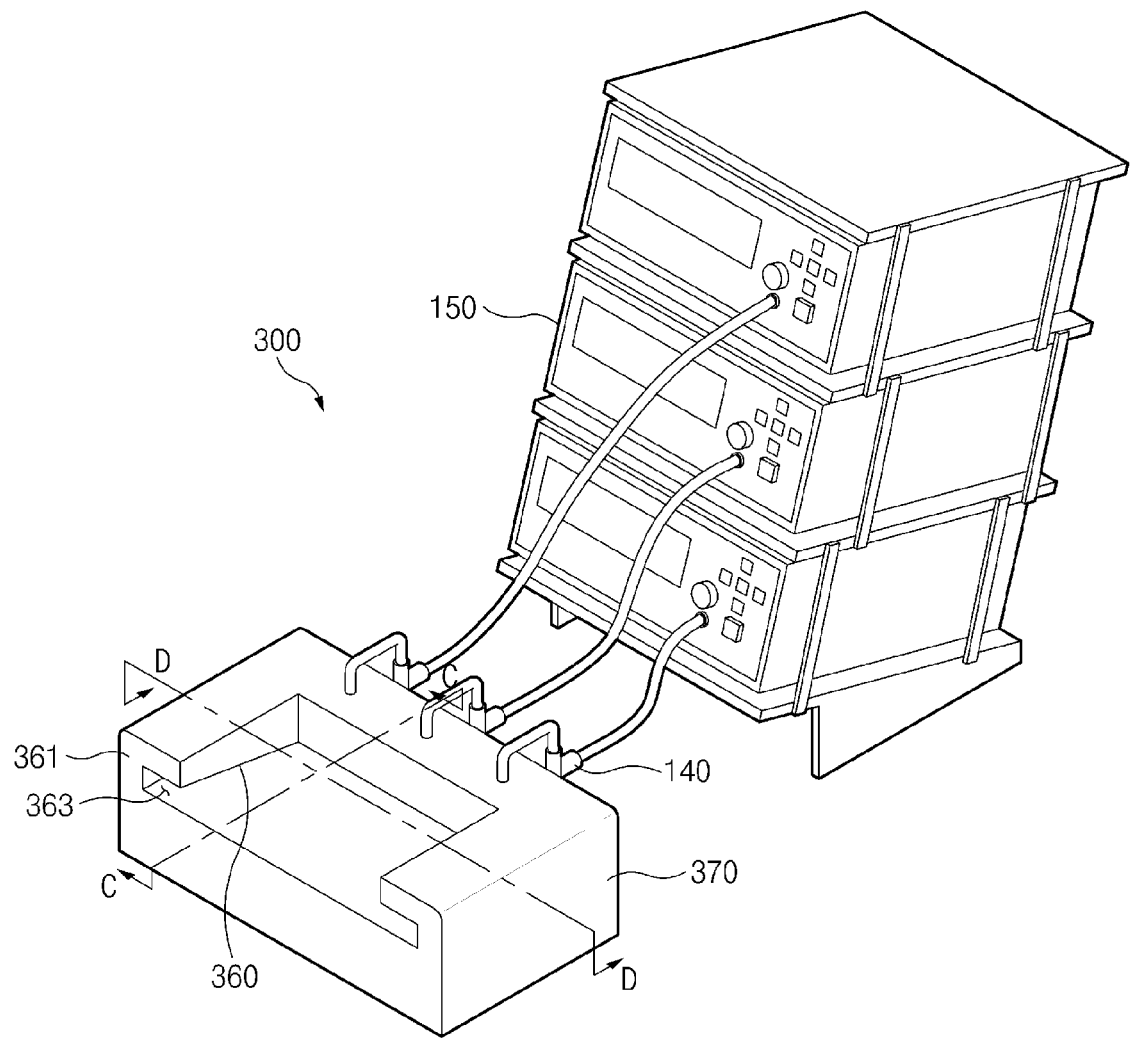
FIG. 10 is a perspective view of an air micrometer according to Embodiment 3 of the present invention.
Figure 11:
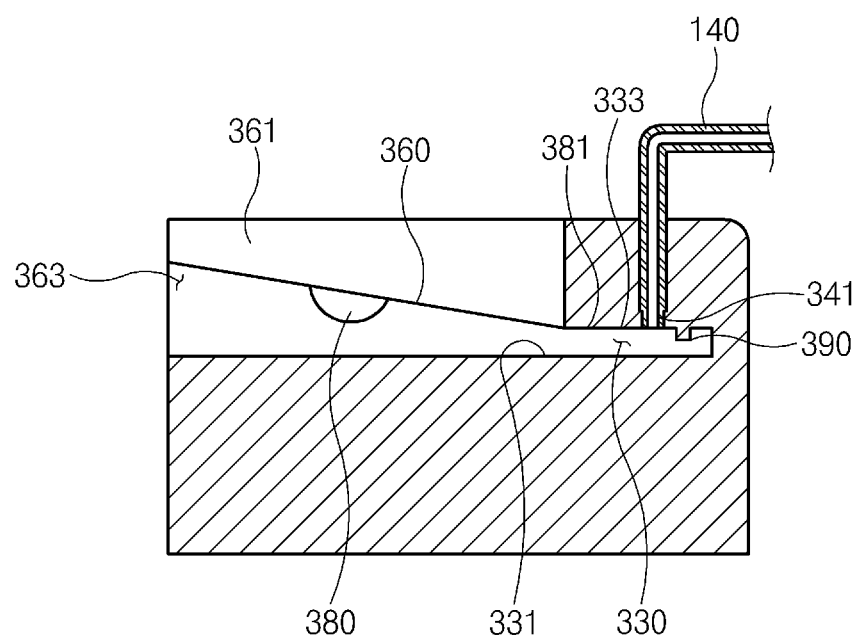
FIG. 11 is a cross-sectional view taken along line C-C of FIG. 10.
Figure 12:
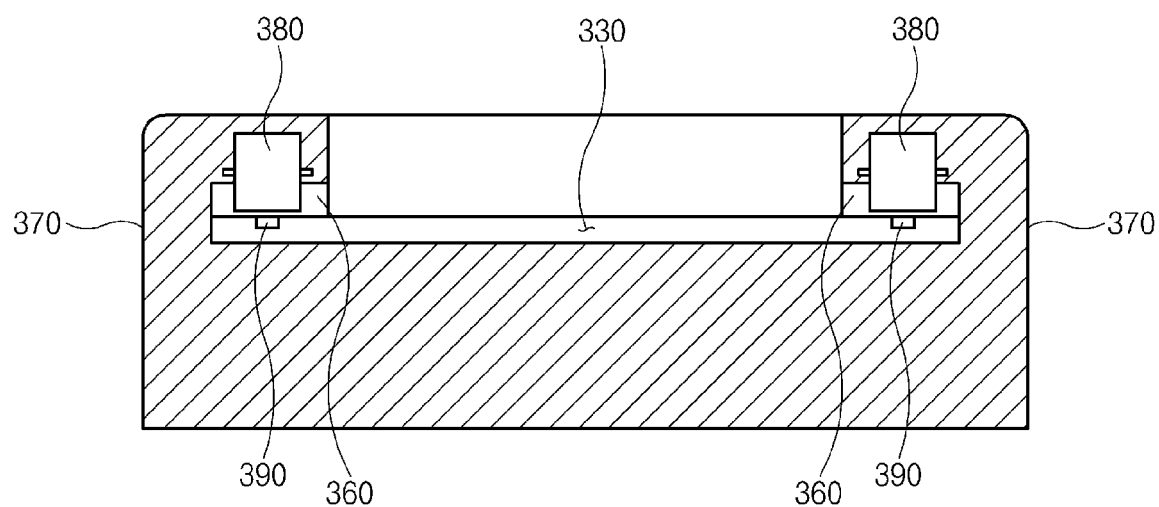
FIG. 12 is a cross-sectional view taken along line D-D of FIG. 10.

FIG. 10 is a perspective view of an air micrometer according to Embodiment 3 of the present invention, FIG. 11 is a cross-sectional view taken along line C-C of FIG. 10, and FIG. 12 is a cross-sectional view taken along line D-D of FIG. 10. For reference, like reference numerals in Embodiment 3 denote like elements in foregoing Embodiments, and thus their detailed description will be omitted. Hereinafter, an air micrometer according to Embodiment 3 of the present invention will be described in detail with reference to FIGS. 10 to 12.

An air micrometer 300 according to Embodiment 3 may further include a sidewall 370 for restraining transversal oscillations of a polymer battery packaging material 103 and a sealing part 105, which are the target objects and inserted into a target object accommodation slot 330. Since the polymer battery packaging material 103 and the sealing part 105, which are the target objects, may transversally move due to a user's unstable operation, the sidewall 370 may prevent the transversal oscillations of the polymer battery packaging material 103 and the sealing part 105 from occurring to accurately measure thicknesses of the target objects.

Referring to FIG. 10, a nozzle 341 opened in a bottom surface 331 or a ceiling surface 333 may be provided in plurality. Three nozzles 341 are provided in the ceiling surface 333 in Embodiment 3 illustrated in FIG. 10.

When the nozzles 341 are provided in all the ceiling surface 333 and the bottom surface 331, air may be sprayed in opposite directions toward the target objects. Thus, the target objects may be unstably disposed to cause a significant error when the thicknesses of the target objects are measured. Therefore, the plurality of nozzles 341 may be provided only in the bottom surface 331 or only in the ceiling surface 333.

When the plurality of nozzles 341 are provided, the polymer battery packaging material 103 and the sealing part 105, which are the target objects, may be measured thickness at the same time at at least two positions. Thus, when the thicknesses are measured at the plurality of positions, the measuring time may be significantly reduced.

As illustrated in FIGS. 10 and 11, the air micrometer 300 according to Embodiment 3 may further include a guide unit

361 having an inclined surface 360 extending upward from an end of the ceiling surface 333.

The guide unit 361 may be a unit for allowing the polymer battery packaging material 103 and the sealing part 105, which are the target objects, to be more easily and quickly inserted into the target object accommodation slot 330. Since the guide unit 361 has an inlet 363 that has a width greater than the a width of the target object accommodation slot 330, the polymer battery packaging material 103 and the sealing part 105, which are the target objects, may be easily inserted into the guide unit 361. Thereafter, since the guide unit 361 may guide the target objects to allow the target objects to be inserted into the target object accommodation slot 330, the target objects may be more easily inserted into the target object accommodation slot 330.

The guide unit 361 having only the inclined surface 360 that extends upward from the end of the ceiling surface 333 is illustrated in FIGS. 10 to 12. Although not shown, the guide unit 361 may include an inclined surface that extends downward from the end of the bottom surface 331. Alternatively, the guide unit 361 may include the inclined surface 361 that extends upward from the end of the ceiling surface 333 and the inclined surface that extends downward from the end of the bottom surface 331. However, in this case, the ceiling surface 333 and the bottom surface 331 of the target object accommodation slot 330 may be disposed parallel to each other as ever to prevent an error from occurring when the thicknesses of the target objects are measured.

Referring to FIGS. 11 and 12, the air micrometer 300 according to Embodiment 3 may further include a roller 380 having a cylindrical shape on at least one section of the inclined surface 360 of the guide unit 361. Alternatively, the roller 380 may have other shapes such as a globular shape, and so on. As describe above, the guide unit 361 may guide the polymer battery packaging material 103 and the sealing part 105, which are the target objects, to allow the target objects to be easily inserted into the target object accommodation slot 330. Here, the roller 380 may serve as an auxiliary unit for the guide unit 361. That is, the roller 380 may be provided to more smoothly and quickly guide the target objects into the target object accommodation slot 330.

The above-described roller 380 may be disposed in an inlet 381 of the target object accommodation slot 330 in addition to the at least one section of the inclined surface 360 of the guide unit 361. In this case, the roller 380 may allow the target objects to more smoothly move in the target object accommodation slot 330.

Referring to FIG. 11, the air micrometer 300 according to Embodiment 3, which measures the thicknesses of the polymer battery packaging material 103 and the sealing part 105, which are the target objects, may further include a stopper 390 for limiting an inserted depth of each of the target objects into the target object accommodation slot 330. As illustrated in FIG. 11, the stopper 390 may be provided in the target object accommodation slot 330. The stopper 390 may extend from the ceiling surface 333 or the bottom surface 331 of the target object accommodation slot 330. The stopper 390 may have a column or partition wall shape connecting the ceiling surface 333 to the bottom surface 331.

If the stopper 390 is not provided, the polymer battery packaging material 103 and the sealing part 105, which are target objects, may be needed to move in various directions so as to align positions to be measured (hereinafter, referred to target positions) of the target objects with those of the nozzles 341. In this process, it may unnecessarily take a lot of time.

If the stopper 390 is provided as described in Embodiment 3, the stopper 390 may block the target objects that are inserted into the target object accommodation slot 330 to prevent the target objects from being further inserted into the target object accommodation slot 330. Thus, the target positions on the target objects may be quickly arranged on the positions corresponding to the nozzle 341, thereby quickly measuring the thicknesses at the target positions.

Referring to FIGS. 5 and 6, an inner partition wall 190 in the target object accommodation slot 130, which is formed by the upper and lower blocks 161 and 163 that meet each other according to Embodiment 1 may prevent the target objects from being further inserted into the target object accommodation slot 330 to a predetermined depth or more. Thus, the inner partition wall 190 of Embodiment 1 may act as a kind of stopper.

While this invention has been particularly shown and described with reference to preferred embodiments thereof and drawings, it will be understood by those skilled in the art that various changes in form and details may be made therein without departing from the spirit and scope of the invention as defined by the appended claims.

The invention claimed is:

1. An air micrometer for measuring a thickness of a polymer battery packaging material or sealing part, which is a target object to be measured, by using a change in pressure of air sprayed onto the target object, the air micrometer comprising:
   a target object accommodation slot having a bottom surface and a ceiling surface to accommodate at least one portion of the target object between the bottom surface and the ceiling surface;
   an air spray unit comprising a nozzle opened in the bottom surface or the ceiling surface to spray the air onto the target object that is accommodated between the bottom surface and the ceiling surface;
   at least one sidewall laterally supporting the target object accommodated in the target object accommodation slot to restrain a transversal oscillation of the target object; and
   a guide unit having at least one inclined surface of an inclined surface that extends upward from an end of the ceiling surface or an inclined surface that extends downward from an end of the bottom surface,
   wherein the sidewall and the guide unit are connected to each other, and
   wherein an inclination angle of the inclined surface is fixed.

2. The air micrometer of claim 1, wherein a distance between the bottom surface and the ceiling surface is adjustable.

3. The air micrometer of claim 1, further comprising a guide rod for adjusting a distance between the bottom surface and the ceiling surface,
   wherein at least one block of a lower block having the bottom surface or an upper block having the ceiling surface is slidably coupled to the guide rod so that the at least one block moves in a direction that is close to or away from the other block.

4. The air micrometer of claim 1, wherein the nozzle is provided in plurality on only the bottom surface or only the ceiling surface.

5. The air micrometer of claim 1, further comprising a globular or cylindrical roller disposed in at least one portion of the inclined surface or an inlet of the target object accommodation slot.

6. The air micrometer of claim 1, further comprising a stopper disposed in the target object accommodation slot to limit an inserted depth of the target object into the target object accommodation slot.

7. An air micrometer for measuring a thickness of a polymer battery packaging material or sealing part, which is a target object to be measured, by using a change in pressure of air sprayed onto the target object, the air micrometer comprising:
- a target object accommodation slot having a bottom surface and a ceiling surface to accommodate at least one portion of the target object between the bottom surface and the ceiling surface; and
- an air spray unit comprising a nozzle opened in the bottom surface or the ceiling surface to spray the air onto the target object that is accommodated between the bottom surface and the ceiling surface,
- wherein a distance between the bottom surface and the ceiling surface is adjustable.

8. An air micrometer for measuring a thickness of a polymer battery packaging material or sealing part, which is a target object to be measured, by using a change in pressure of air sprayed onto the target object, the air micrometer comprising:
- a target object accommodation slot having a bottom surface and a ceiling surface to accommodate at least one portion of the target object between the bottom surface and the ceiling surface;
- an air spray unit comprising a nozzle opened in the bottom surface or the ceiling surface to spray the air onto the target object that is accommodated between the bottom surface and the ceiling surface; and
- a conduit extending from an external surface of the first block to the first surface of the target object accommodation slot for supplying air to the target object accommodation slot.

* * * * *